(12) United States Patent
Jang et al.

(10) Patent No.: US 9,632,719 B2
(45) Date of Patent: Apr. 25, 2017

(54) STORAGE DEVICE WITH FIRMWARE SYNCHRONIZATION FUNCTION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jiing-Shyang Jang, New Taipei (TW); Hsin-Ting Ke, New Taipei (TW); Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 2 days.

(21) Appl. No.: 14/753,256

(22) Filed: Jun. 29, 2015

(65) Prior Publication Data
US 2016/0378387 A1 Dec. 29, 2016

(51) Int. Cl.
*G06F 3/12* (2006.01)
*G06F 3/06* (2006.01)
*G06F 9/44* (2006.01)
*G06F 17/22* (2006.01)

(52) U.S. Cl.
CPC .......... *G06F 3/0629* (2013.01); *G06F 3/0604* (2013.01); *G06F 3/0674* (2013.01); *G06F 3/0683* (2013.01); *G06F 3/123* (2013.01); *G06F 8/71* (2013.01); *G06F 17/2288* (2013.01)

(58) Field of Classification Search
CPC .... G06F 3/0674; G06F 3/123; G06F 11/1487; G06F 17/2288
USPC ................. 711/112, 155; 717/170
See application file for complete search history.

(56) References Cited

U.S. PATENT DOCUMENTS

| | | | |
|---|---|---|---|
| 7,013,362 B1* | 3/2006 | Ervin | 711/2 |
| 2005/0166015 A1* | 7/2005 | Bruner et al. | 711/112 |
| 2010/0325326 A1* | 12/2010 | Huang et al. | 710/110 |
| 2013/0139141 A1* | 5/2013 | Wang | 717/170 |

* cited by examiner

*Primary Examiner* — Than Nguyen
(74) *Attorney, Agent, or Firm* — Steven Reiss

(57) ABSTRACT

A storage device includes a primary storage extension chip, a plurality of secondary storage extension chips, and a plurality of resistors. Each of the storage extension chips includes two data pins, a plurality of general purpose input/output (GPIO) pins, and a firmware. Each of the GPIO pins is connected to a power terminal through one resistor, and is grounded through a resistor, for setting a firmware version number of storage extension chips. The primary storage extension chip determines whether the version number of each secondary storage extension chip is same as that of the primary storage extension chip. If the version number is different from that of the primary storage extension chip, the firmware version number of the primary storage extension chip is applied to the secondary storage extension chip.

10 Claims, 2 Drawing Sheets

STORAGE DEVICE WITH FIRMWARE SYNCHRONIZATION FUNCTION

FIELD

The subject matter herein generally relates to storage devices.

BACKGROUND

A just a bunch of disks (JBOD) system usually includes one level or a multilevel extended chip to control a plurality of hard disks. Each level of the extended chip includes a corresponding firmware (FW) to carry out a function. However, if a JBOD system includes a plurality of version numbers of the FW, the JBOD system will not operate normally.

Therefore, there is need for improvement in the art.

BRIEF DESCRIPTION OF THE DRAWINGS

Implementations of the present technology will now be described, by way of example only, with reference to the attached figures.

DETAILED DESCRIPTION

Figure 1:
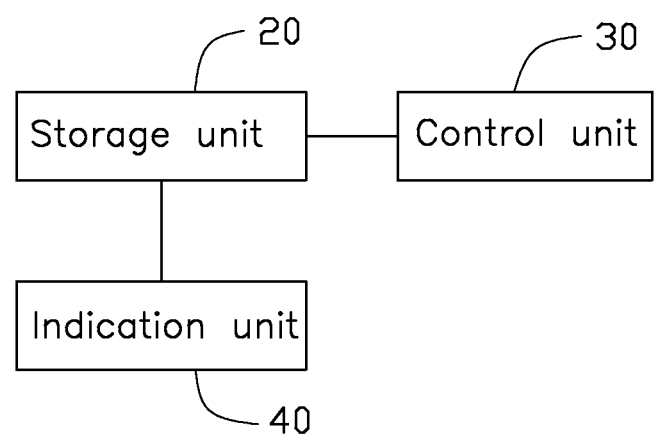
FIG. 1 is a block diagram of an example embodiment of a storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure is described in relation to a storage device.

FIG. 1 illustrates an example embodiment of a storage device 100. The storage device 100 can comprise a storage unit 20, a control unit 30, and an indication 40. The control unit 30 and the indication 40 are electrically coupled to the storage unit 20.

Figure 2:
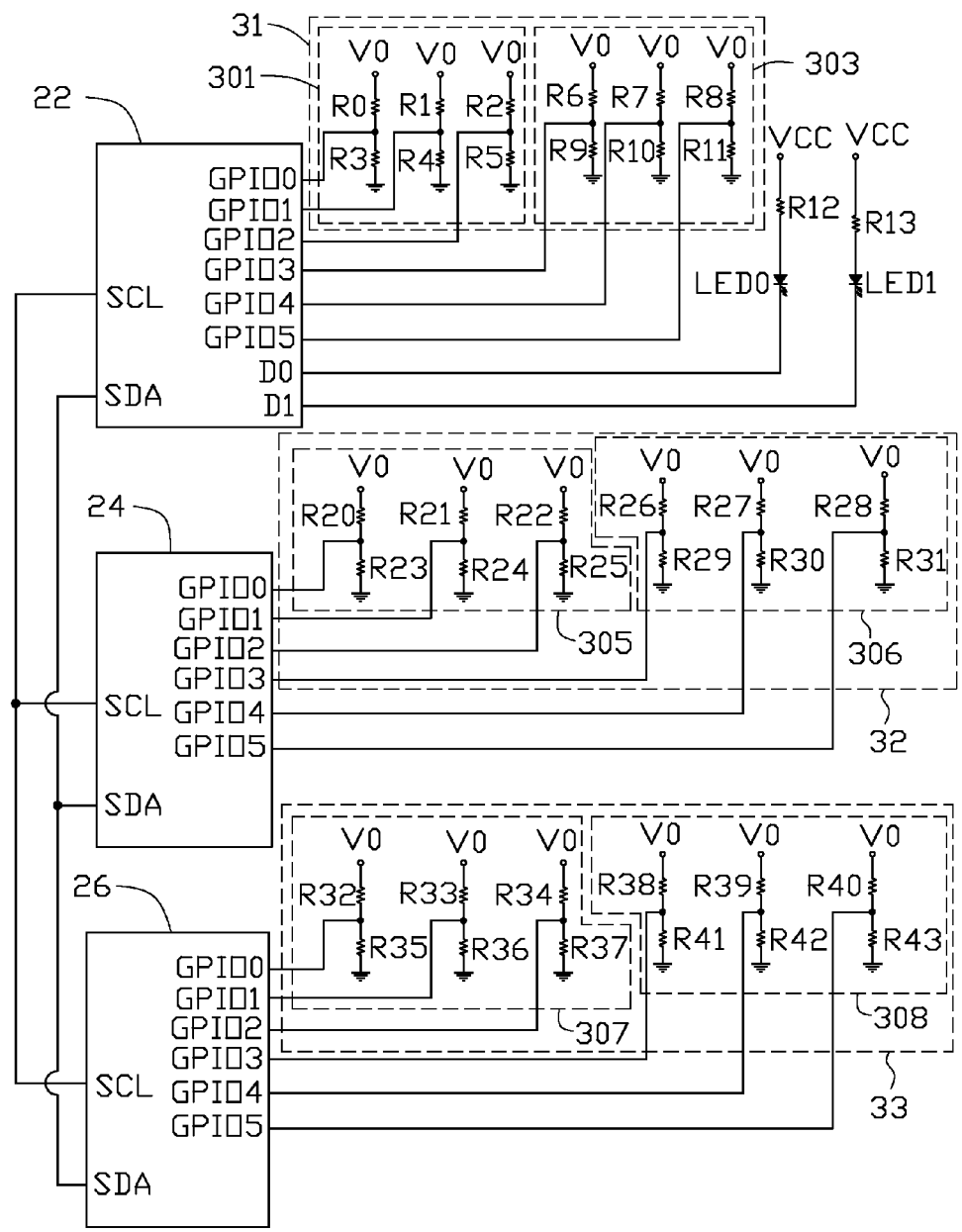
FIG. 2 is a circuit diagram of an embodiment of the storage device of FIG. 1.

FIG. 2 illustrates a circuit diagram of an embodiment of the storage device 10. The storage unit 20 can comprise a primary storage extension chip 22 and two secondary storage extension chips 24, 26. The primary storage extension chip 22 can comprise two data pins SCL and SDA, six general purpose input/output (GPIO) pins GPIO0,GPIO1, GPIO2,GPIO3,GPIO4, and GPIO5, and two indication pins D0, D1. Each of the secondary storage extension chips 24, 26 can comprise two data pins SCL and SDA, and six GPIO pins GPIO0-GPIO5. The data pins SCL and SDA of each of the secondary storage extension chips 24, 26 are electrically coupled to the data pins SCL and SDA of the primary storage extension chip 22 through an inter-integrated circuit (I2C) bus. Each of the storage extension chips can comprise a firmware (FW) to carry out a function. The control unit 30 can comprise a first setting unit 31, a second setting unit 32, and a third setting unit 33. The first setting unit 31 is electrically coupled to the primary storage extension chip 22. The second setting unit 32 is electrically coupled to the secondary storage extension chip 24. The third setting unit 33 is electrically coupled to the secondary storage extension chip 26.

The first setting unit 31 can comprise a version number setting unit 301 and a serial number setting unit 303. The version number setting unit 301 can comprise six resistors R0,R1,R2,R3,R4, and R5. The serial number setting unit 303 can comprise six resistors R5,R7,R8,R9,R10, and R11. The GPIO pins GPIO1, GPIO2, and GPIO3 of the primary storage extension chip 22 are electrically coupled to a power terminal V0 through resistors R0, R1, and R2 respectively, and are electrically coupled to ground through resistors R3, R4, and R5, to enable an FW version number of the primary storage extension chip 22 to be set through the version number setting unit 301. The GPIO pins GPIO3, GPIO4, and GPIO5 of the primary storage extension chip 22 are electrically coupled to the power terminal V0 through resistors R6, R7, and R8 respectively, and are electrically coupled to ground through resistors R9, R10, and R11, to enable the function of setting a serial number of the primary storage extension chip 22 through the serial number setting unit 303.

In at least one embodiment, the second setting unit 32 can comprise a version number setting unit 305 and a serial number setting unit 306. The version number setting unit 305 can comprise six resistors R20, R21, R22, R23, R24, and R25. The serial number setting unit 306 can comprise six resistors R26, R27, R28, R29, R30, and R31. The third setting unit 33 can comprise a version number setting unit 307 and a serial number setting unit 308. The version number setting unit 307 can comprise six resistors R32, R33, R34, R35, R36, and R37. The serial number setting unit 308 can comprise six resistors R38, R39, R40, R41, R42, and R43. The circuit structure of the second and third setting units 32, 33 is the same as that of the first setting unit 31. The connection relationship and working principle between the secondary storage extension chip 24 and the second setting unit 32, and the secondary storage extension chip 26 and the third setting unit 33 are the same as those of the primary storage extension chip 22 and the first setting unit 31.

The indication unit 40 can comprise two light emitting diodes (LEDs) LED0 and LED1, with each having a different color. Cathodes of the LEDs LED0 and LED1 are electrically coupled to the two indication pins D0 and D1 of the primary storage extension chip 22 respectively. Anodes of the LEDs LED0 and LED1 are electrically coupled to a power terminal VCC through resistors R12 and R13. In at least one embodiment, the respective colors of the LEDs LED0 and LED1 are green and red.

During production of the primary storage extension chip 22 and secondary storage extension chip 24, 26, the power terminal V0 is powered on, to set an FW version number for the corresponding extended chip and a serial number of the corresponding extended chip. For example, if the power terminal V0 which is electrically coupled to the resistor R1 and the resistor R8 is powered on, the FW version number of the primary storage extension chip 22 is "010". The serial number of primary storage extension chip 22 is "001."

In at least one embodiment, the GPIO pins GPIO0, GPIO1, and GPIO2 of the secondary storage extension chip 24 are electrically coupled to the power terminal V0 through the resistors R20, R21, and R22 respectively, and are electrically coupled to ground through the resistors R23, R24, and R25. The GPIO pins GPIO3, GPIO4, and GPIO5 of the secondary storage extension chip 24 are electrically coupled to the power terminal V0 through the resistors R26, R27, and R28 respectively, and are electrically coupled to ground through the resistors R29, R30, and R31. The GPIO pins GPIO0, GPIO1, and GPIO2 of the secondary storage extension chip 26 are electrically coupled to the power terminal V0 through the resistors R32, R33, and R34 respectively, and are electrically coupled to ground through the resistors R35, R36, and R37. The GPIO pins GPIO3, GPIO4, and GPIO5 of the secondary storage extension chip 26 are electrically coupled to the power terminal V0 through the resistors R38, R39, and R40 respectively, and are electrically coupled to ground through the resistors R41, R42, and R43. If the power terminal V0 electrically coupled to the resistors R21 and R26 is powered on, the FW version number of the secondary storage extension chip 24 is "010." The serial number of secondary storage extension chip 24 is "100." If the power terminal V0 electrically coupled to the resistors R34 and R40 is powered on, the FW version number of the secondary storage extension chip 26 is "001." The serial number of secondary storage extension chip 26 is "001."

The FW version numbers and the serial numbers of the secondary storage extension chip 24, 26 are transmitted to the primary storage extension chip 22 through the I2C bus. When the "001" FW version number of the secondary storage extension chip 26 is different from the "010" FW version number of the primary storage extension chip 22, the indication pin D1 of the primary storage extension chip 22 outputs a digital low signal and the red LED LED1 is lit. The serial number "010" of the secondary storage extension chip 26 is transmitted to the primary storage extension chip 22 through the two data pins SCL, SDA and the I2C bus. The "010" FW version number of the primary storage extension chip 22 is synchronized to the FW of the secondary storage extension chip 26, according to the serial number "010" received by the primary storage extension chip 22, to make FW version number of the secondary storage extension chip 26 the same as the FW version number of the primary storage extension chip 22. In the synchronizing process, the indication pin D0 of the primary storage extension chip 22 outputs a square wave signal. The green LED LED0 flickers. When the synchronizing process is finished, the green LED LED0 is lit steadily, and the red LED LED1 is turned off and extinguished. The steady lighting time of the green LED LED0 can be preset to be about 2 minutes, to indicate that the FW version numbers of the primary storage extension chip 22 and of the secondary storage extension chip 24, 26 of the storage unit 20 are the same.

When the serial number "001" of the secondary storage extension chip 26 is transmitted to the primary storage extension chip 22, and the serial number of the secondary storage extension chip 26 is the same as that of the primary storage extension chip 22, the red LED LED1 is lit. If the green LED LED0 has not been lit within the 4 minutes for which the lighting time of the red LED LED1 is preset, this indicates that the serial numbers of at least two extended chips of the storage unit 20 are the same, to mean that at least two extended chips need to be detected and debugged.

Therefore, the primary storage extension chip 22 can acquire the FW version number of each of the secondary storage extension chips, to determine whether the FW version number of each secondary storage extension chip is the same as the FW version number of the primary storage extension chip 22. If the FW version number of at least one of the secondary storage extension chips 24 and 26 is different from the FW version number of the primary storage extension chip 22, the FW version number of the primary storage extension chip 22 can be synchronized to the FW version number of at least one of the secondary storage extension chips 24 and 26, to make the FW version number of at least one of the secondary storage extension chips 24, 26 the same as the FW version number of the primary storage extension chip 22 Furthermore, the serial number of each of the extended chips is detectable, to determine whether the serial number is the same as that of the other extended chips requiring detection and possible debugging.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A storage device comprising:
    a storage unit comprising a primary storage extension chip and a plurality of secondary storage extension chips, each of the primary storage extension chip and the plurality of secondary storage extension chips comprising a first data pin, a second data pin, a firmware, the first and second data pins of the primary storage extension chip electrically coupled to the first and second data pins of the plurality of secondary storage extension chips; and
    a control unit comprising at least two setting units, to electrically couple to the primary storage extension chip and the plurality of secondary storage extension chips, wherein each of the setting unit comprises a version number setting unit, and configured to set firmware version numbers of the primary storage extension chip and the plurality of secondary storage extension chips, through the corresponding version number setting unit; and
    the primary storage extension chip determines whether the firmware version number of at least one secondary storage extension chip is different from the firmware version number of the primary storage extension chip; if the firmware version number of at least one secondary storage extension chip is different from the firmware version number of the primary storage extension chip, the firmware version number of the primary storage extension chip is synchronized to the firmware version number of the corresponding secondary storage extension chip, and firmware data of the primary storage extension chip is synchronized to firmware data of the corresponding secondary storage extension chip;
    wherein each of the primary storage extension chip and the plurality of secondary storage extension chips comprises a first group of GPIO pins, the first group of GPIO pins of each of the primary storage extension chip and the plurality of secondary storage extension chips are electrically coupled to the version number setting unit of the corresponding setting unit; and each GPIO pin is electrically coupled to a power terminal through a corresponding resistor, and is electrically coupled to ground through a corresponding resistor.

2. The storage device of claim 1, further comprising a second group of GPIO pins, each of the setting unit comprises a serial number setting unit, the second group of GPIO pins of the primary storage extension chip and the plurality of secondary storage extension chips are coupled to the serial number setting unit of the corresponding setting unit, and configured to set serial numbers of the primary storage extension chip.

3. The storage device of claim 2, wherein the first group of GPIO pins comprise a first to third GPIO pins, the second group of GPIO pins comprise a fourth to fifth GPIO pins.

4. The storage device of claim 1, further comprising an indication unit, wherein the indication unit is electrically coupled to the storage unit, and configured to indicate whether the firmware version number of the primary storage extension chip is equivalent to each secondary storage extension chip.

5. The storage device of claim 4, wherein the indication unit comprises a first light emitting diode and a second light emitting diode, when the firmware version numbers of the primary storage extension chip and each secondary storage extension chip are the same, the first light emitting diode is lit; when the firmware version number of at least one secondary storage extension chip is different from the primary storage extension chip, the second light emitting diode is lit.

6. The storage device of claim 5, wherein the anode of the first light emitting diode is electrically coupled to the power terminal through a resistor, and the anode of the second light emitting diode is electrically coupled to the power terminal through a resistor.

7. The storage device of claim 5, wherein the primary storage extension chip comprises a first indication pin and a second indication pin, cathodes of the first and second light emitting diodes are electrically coupled to the first and second indication pins of the primary storage extension chip respectively, anodes of the first and second light emitting diodes are coupled to a power terminal.

8. The storage device of claim 6, wherein when the at least one secondary storage extension chip is different from the version numbers of FW of the primary storage extension chip, the second light emitting diode is lit for a preset time.

9. The storage device of claim 1, wherein the primary storage extension chip acquires the firmware version number of each secondary storage extension chip through the first data pin and the second data pin, to determine whether the firmware version number of each secondary storage extension chip is equivalent to the firmware version number of the primary storage extension chip.

10. A storage device comprising:
a storage unit comprising a primary storage extension chip and a plurality of secondary storage extension chips, each of the primary storage extension chip and the plurality of secondary storage extension chips comprising a first data pin, a second data pin, a firmware, the first and second data pins of the primary storage extension chip electrically coupled to the first and second data pins of the plurality of secondary storage extension chips;
a control unit comprising at least two setting units, to electrically couple to the primary storage extension chip and the plurality of secondary storage extension chips, wherein each of the setting unit comprises a version number setting unit, and configured to set firmware version numbers of the primary storage extension chip and the plurality of secondary storage extension chips, through the corresponding version number setting unit; and
an indication unit electrically coupled to the storage unit, and configured to indicate whether the firmware version number of the primary storage extension chip is equivalent to each secondary storage extension chip;
wherein if the firmware version number of at least one secondary storage extension chip is different from the firmware version number of the primary storage extension chip, the firmware version number of the primary storage extension chip is synchronized to the firmware version number of the corresponding secondary storage extension chip, and firmware data of the primary storage extension chip is synchronized to firmware data of the corresponding secondary storage extension chip; and
wherein the indication unit comprises a first light emitting diode and a second light emitting diode, when the firmware version numbers of the primary storage extension chip and each secondary storage extension chip are the same, the first light emitting diode is lit; when the firmware version number of at least one secondary storage extension chip is different from the primary storage extension chip, the second light emitting diode is lit.

* * * * *